United States Patent [19]

Tou et al.

[11] Patent Number: 4,930,071
[45] Date of Patent: May 29, 1990

[54] METHOD FOR INTEGRATING A KNOWLEDGE-BASED SYSTEM WITH AN ARBITRARY DATABASE SYSTEM

[75] Inventors: Frederich N. Tou, Sunnyvale, Calif.; Wagar Hasan, Allahabad, India

[73] Assignee: IntelliCorp, Inc., Mountain View, Calif.

[21] Appl. No.: 64,971

[22] Filed: Jun. 19, 1987

[51] Int. Cl.$^5$ .............................................. G06F 15/20
[52] U.S. Cl. ................................ 364/300; 364/283.4; 364/274.3; 364/200
[58] Field of Search ................................ 364/200, 900

[56] References Cited

U.S. PATENT DOCUMENTS 4,631,664 12/1986 Bachman .............................. 364/200
4,670,848 6/1987 Schramm ............................. 364/200
4,675,829 6/1987 Clemenson .......................... 364/513

OTHER PUBLICATIONS

Raymond E. Carhart, Installing and Using the KEE*/-Mapper Interface (KEEMAP), IntelliCorp, Inc. 1987.
Robert M. Abarbanel, Michael D. Williams, A Relational Representation for Knowledge Bases, IntelliCorp, Inc. 1986.
Michael L. Brodie et al., On Knowledge Bases Management Systems, Springer-Verlag, 1986, "Building a Bridge to Expert Systems", Datamation, Jan. 1, 1987, pp. 17–19.

*Primary Examiner*—Gareth D. Shaw
*Assistant Examiner*—Debra A. Chun
*Attorney, Agent, or Firm*—Townsend and Townsend

[57] ABSTRACT

A method and system are provided for mapping between an application relational database of arbitrary structure and an application knowledge base in order to permit a user to draw inference through a knowledge base. Also included are procedures for translating knowledge base queries into database queries, for transforming data retrieved from the database into units (structured objects) in the knowledge base and for updating a relational database based on changes made to the application knowledge base. These procedures are supported by general purpose knowledge bases. The method includes providing mapping knowledge bases for storing the mapping between an arbitrary relational database and the application knowledge base. The mapping between classes in the application knowledge base and the relations on a database is stored explicitly in units in a user mapping knowledge base. These units are called class maps. The mapping between the slots of a class in an application knowledge base and the attributes of the above relations on the database is stored explicitly in a slot of the class map corresponding to the class.

32 Claims, 11 Drawing Sheets

```
Class Map SALES.FORCE-CM

102
  Class.name:        104      (SALES.FORCE PERSONNEL)
  Covering.relation:  106     (EMPLOYEES . E)
  UID.attributes:   108       ((E  . EMPNO))
  Relations:                  (EMPLOYEES . E),(SALARIES . S)
  Join.conditions:   110      ((E  . EMPNO) (S  . EMPNO))
  Member.conditions: 112      (= (E  . DEPT) "SALES")

114
  Slot.maps:

< name >       < attrs >       < func-unit >    < attr-expr >     < joins >       < updatable >

(EMP . ID      ((E . EMPNO))   IDENTITY         (E . EMPNO)       NIL             NIL)
      (NAME          ((E . NAME))    IDENTITY         (E . NAME)        NIL             NIL)
      (ADDRESS       ((E . ADDRESS)) IDENTITY         (E . ADDRESS)     NIL             NIL)
      (WAGE          ((S . SALARY)   IDENTITY         (+ (S . SALARY)   ((E . EMPNO)    NIL)
                      (S . BONUS))                       (S . BONUS))    (S . EMPNO))

116
  Pname.slot.map:

($PRINT.NAME$  ((E . NAME))    IDENTITY         (E . NAME)        NIL             NIL)

118
  UID.name! :        120      |(UID.NAME ! CLASS.MAPS MAPPINGKB) ! method|
  UID.name.inversion! :       |(UID.NAME.INVERSION ! CLASS.MAPS MAPPINGKB) ! method|
  Deletable.member.units.p :  NO
                       122
  < slots containing cached information >
                 124
  Member.conditions.relations:      126   (EMPLOYEES . E)
  Member.conditions.joins:          128   NIL
  Pname.relations:                  130   (EMPLOYEES . E)
  Slot.map.partitions-first:        132   ((E) EMP.ID NAME ADDRESS)
  Slot.map.partitions-rest:         134   ((E S) WAGE)
  Slot.map.partitions.local-first:        ((E) EMP.ID NAME ADDRESS)
  Slot.map.partitions.local-rest:         ((E S) WAGE)
                   136
```

FIGURE 2

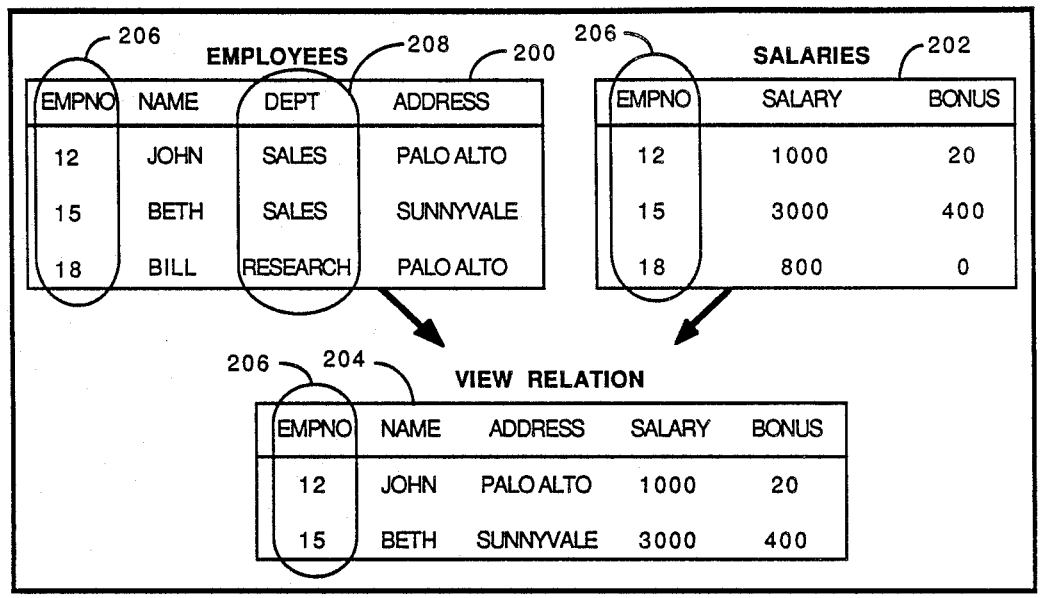
FIGURE 3
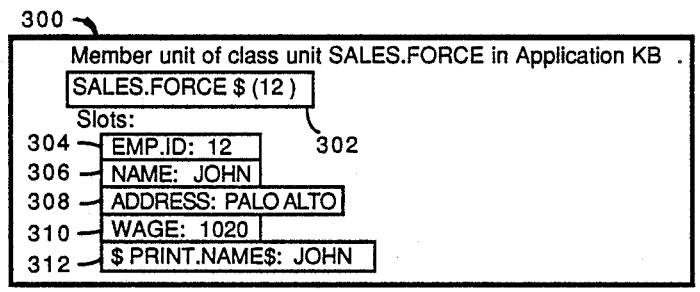
FIGURE 4
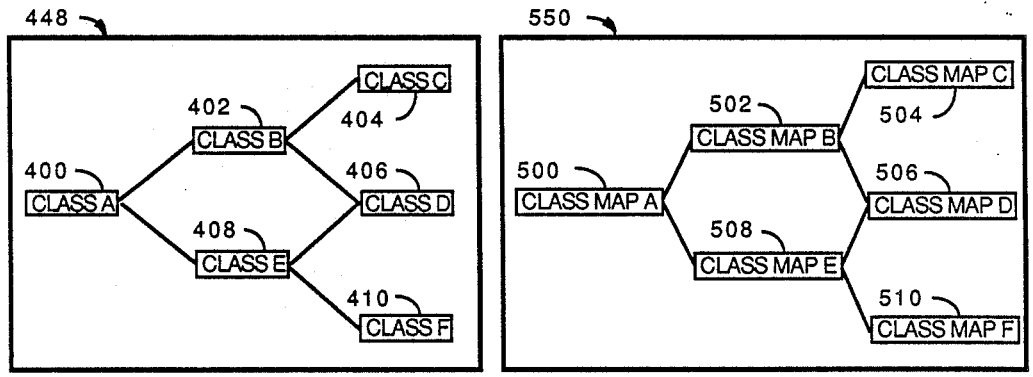
FIGURE 5
FIGURE 6

METHOD FOR INTEGRATING A KNOWLEDGE-BASED SYSTEM WITH AN ARBITRARY DATABASE SYSTEM

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

This invention relates to information processing and more particularly to a method for combining a knowledge-based system with an arbitrary relational database system. This invention presumes familiarity with basic relational database systems terminology, including structured query languages used for database queries, and basic knowledge-based systems terminology, including object-oriented programming techniques and terminology used for knowledge processing applications, that is, applications conventionally associated with the field of artificial intelligence (AI). Object-oriented programming is particularly powerful because mere identification of an object implies the behavior of the object, that is, the allowable functions which can be applied to the object.

To aid in an understanding of this invention, a glossary of terms is included hereinbelow.

The advent of knowledge processing has made possible advances in the capabilities of data processing and software engineering. Knowledge processing has been widely accepted in business, industry and engineering as valuable for handling information.

Heretofore, most of the advances provided by knowledge processing have been limited to use of customized systems and sources of information. Numerous custom systems have been built which exchange data between a knowledge processing application and "flat" (without hierarchy) file sources on host computer systems (generally referred to as mainframes and associated storage devices), but no general system has yet been developed. This represents a major limitation to the potential use of knowledge processing. For many years, one of the valued assets in a business was the ability to store and retrieve information. A good example is a set of records of a large insurance company with many policy holders. The requirements of information users impose significant limitations on the accessibility or the nature of the accessibility of that information. Frequently because of the need to access information quickly from very large databases, it was necessary to design and provide database management systems which were optimized for speed of access. The emphasis was then on the ability to manage large amounts of data. The practical result was relatively easy accessibility of information but lack of tools necessary to process large amounts of information and draw inferences from the implications of the information. Knowledge processing technology is potentially a major advance which would enhance the ability to draw inferences and make decisions based on large amounts of data. The primary limitation, however, is the limited accessibility of existing databases by knowledge processing systems.

The problem of integrating a knowledge-based system with a database system has been known for many years. There are three standard methods for integrating a knowledge-based system with a database system. These are:

1. Enhancing an existing knowledge-based system to include database capabilities or the converse: enhancing an existing database system to include knowledge base capabilities;
2. Coupling a knowledge-based system with a database system; and
3. Integrating the technology of a knowledge-based system with the technology of a database system to create a new class of systems.

Of these, the technique of enhancing a system to provide an extension of a database or knowledge-based system is merely a short-term partial solution; in the long term it may never lead to a generally acceptable solution.

Work is being pursued by others to integrate the technologies. For example, reports of such work are found in a publication edited by Michael L. Brodie and John Mylopoulos entitled *On Knowledge Base Management Systems,* Springer-Verlag New York Inc., 1986. Particular reference is made to Chapter 28 entitled: "The Role of Databases in Knowledge-Based Systems" by M. S. Fox and J. McDermott (pp. 407-430). This chapter describes the current state of the art in coupling technology (method 2) but focuses mostly on the requirements for database techniques in the construction of knowledge-based systems. As such, the work is not directly relevant to the present invention because it deals with the integrating technology (method 3).

The particular field of this invention is an instance of the coupling technology above. It has been found, however, that coupling a knowledge-based system with a database system is extremely difficult unless severe constraints are imposed on the knowledge base or on the database. As a consequence, although custom systems have been provided for coupling a database with a knowledge base, no general system has yet been developed.

Some knowledge-based systems provide communication between a database and a knowledge base via rules, the rules being specific to the application knowledge base. As a consequence, all possible queries that could be asked by the knowledge-based system must be known a priori and coded into the rules. Ad hoc querying of the database is not supported in these types of systems.

Other knowledge-based systems are known for accessing large volumes of data stored in a database. These types of systems often require that the information be stored on the database in a highly stylized format called a schema, which is a form recognizable and accessible by a particular type of query system designed for a specialized knowledge-based system.

Some predicate calculus-based systems provide for coupling a database system to a particular type of knowledge-based system. An example is Quintus Prolog, a language provided by Quintus Computer Systems of Mountain View, Calif. Therein each table of a relational database system can be directly identified with a Prolog functor. The Prolog compiler is operative to convert Prolog goals based on such a functor into a simple database query. It will be observed that the Prolog query is merely a restatement of the database query in Prolog syntax.

A precursor to the present invention is described by R. M. Abarbanel and M. D. Williams entitled "A Relational Representation for Knowledge Bases," presented at the First International Conference on Expert Database Systems, Apr. 1–4, 1986 (sponsored by the Institute of Information Management, Technology and Policy and the University of South Carolina). In this work, ad hoc querying was supported, but the data in the database had to be fully normalized into what is known as the Third Normal Form, and each record in the database had to be provided with a unique identifier. Thus the database was required to adopt a predefined format.

Another precursor to the present invention is KEE-MAP, a prototype specialty product which has been licensed by IntelliCorp, Inc., the assignee of the present invention, to third parties on a limited basis. The system is described in work by Raymond E. Carhart, "Installing and Using the KEE/MAPPER Interface," (unpublished 1987). This system represents each database attribute as a unit and supports simple single-variable predicates on those attributes. This is essentially a direct representation of database attributes in a knowledge base so that a knowledge base query is merely a restatement of a database query.

GLOSSARY

The following is a glossary of some of the terms used in these technologies.

Data: Raw facts or values which are physically recorded and which can be extracted and objectively verified.

Information: Anything learned from data, i.e., the "meaning" of data.

Value: An amount of worth.

Knowledge: Abstractions, categorizations and generalizations derived from data which cannot be easily objectively verified.

Database (DB): A computerized collection of data.

Relational Database (RDB): A database in which all data are stored and organized in tables and in which each field containing a datum is equally accessible.

Relational Database Management System (RDBMS): The software and hardware environment supporting a Relational Database including the decision making elements but without a notion of knowledge in the data.

Knowledge Base (KB): A computerized collection of knowledge organized into a taxonomy and including a theory (calculus) for interpreting the knowledge about a subject.

Knowledge-Based System (KBS): The software and hardware environment supporting a knowledge base.

Knowledge Processing: Application of inferences to data and knowledge to obtain further knowledge.

File: A bounded storage element of a computer-based storage system.

Database Terms:
  Record: A collection of fields; the basic accessible element of a file.
  Field: An elemental entity of a record.
  Relational Database Terms:
    Relation: An orderly arrangement of data in columns and rows; a table.
    Attribute: A "Column" of a relation; a field of a tuple.
    Tuple: A record of a relational database; one line or row of a table or relation.
Knowledge Base Terms:
  Object: Elemental accessible entity of a knowledge base file; the elemental abstract entity of knowledge about a subject; a structure of information which describes a physical item, a concept or an activity, including a group of other objects.
  Unit: A structured representation of a particular object; contains declarative, procedural and structured information about the object; consists of an identifying name and a set of slots representing characteristics about the object. Units describe objects or groups of objects.
  Frame: A variant of the term "unit". A frame, unit or object may differ in characteristics depending on the theory of interpretation associated with the knowledge base.
  Slot: An elemental entity of an object, analogous to a database field; represents characteristics of an object.
  Class: A unit which describes a category or group of objects.
  Member: A unit which is contained within a class. If Unit A is a member of Class B, then Class B is a Parent of Unit A.
  Map (to map): To translate source data via a process into target data.
  Inference: A conclusion drawn about an object from premises or facts.
  Inheritance: The process of transferring characteristics (slots and their values) to an object from its ancestors in the context of the process for interpreting the knowledge base.

Other terms will be defined in the context of the invention hereinafter explained.

SUMMARY OF THE INVENTION

According to the invention, a method and system are provided for representing a mapping between the relations and attributes of a relational database of arbitrary structure and the classes and members of an application knowledge base, and employing the mapping to translate knowledge base queries into database queries and to transform data retrieved from the database into units (structured objects) in the knowledge base by providing a mapping knowledge base for storing the mapping between a database and a knowledge base. The mapping between classes in a knowledge base and the relations on a database is stored explicitly in units in a mapping knowledge base. These units are called class maps. The mapping between the slots of a class in a knowledge base and the attributes of the above relations on the database is stored explicitly in a slot of the class map corresponding to the class. This slot of the class map is called the "slot map" slot. The values of the "slot map" slot are called slot maps.

The method according to the invention includes a procedure for using the mapping knowledge base to translate queries expressed in the terminology of a knowledge base into queries expressed in the terminology of a database. The knowledge of how to translate a knowledge base function into a database function is stored in yet another set of knowledge bases called, respectively, the functions knowledge base, the translation knowledge base and the translators knowledge base. The knowledge of how to translate a slot into attributes in a relational database is stored in a special-purpose mapping knowledge base which is derived from a system mapping knowledge base as hereinafter explained.

An advantage of the invention lies in the separation of the mapping component (which defines the structure and relationship between the database and the knowledge base) from the procedural components (which set out the generalized principles for translation of queries and transformation of data). The mapping component contains strictly declarative elements (except for trivial procedural elements such as naming of units). The procedural components may contain declarative elements and procedural elements. Thus, the same procedural components can be used with different mapping knowledge bases for different applications.

The invention will be better understood by reference to the following detailed description taken in connection with the accompanying drawings.

BRIEF DESCRIPTION OF THE DRAWINGS

FIG. 2 is a diagram of a specific embodiment of a class map of a user mapping knowledge base illustrating an example of the invention.

FIG. 3 is a diagram of a specific embodiment of a plurality of relations in an arbitrary relational database for illustrating the invention.

FIG. 4 is a diagram of a specific embodiment of a member unit of a class unit in an application knowledge base illustrating an example of the invention.

FIG. 5 is a taxonomy of an application knowledge base illustrating an example of the invention.

FIG. 6 is a taxonomy of the class maps of a user mapping knowledge base illustrating an example of the invention.

DETAILED DESCRIPTION OF SPECIFIC EMBODIMENTS

Figure 1:
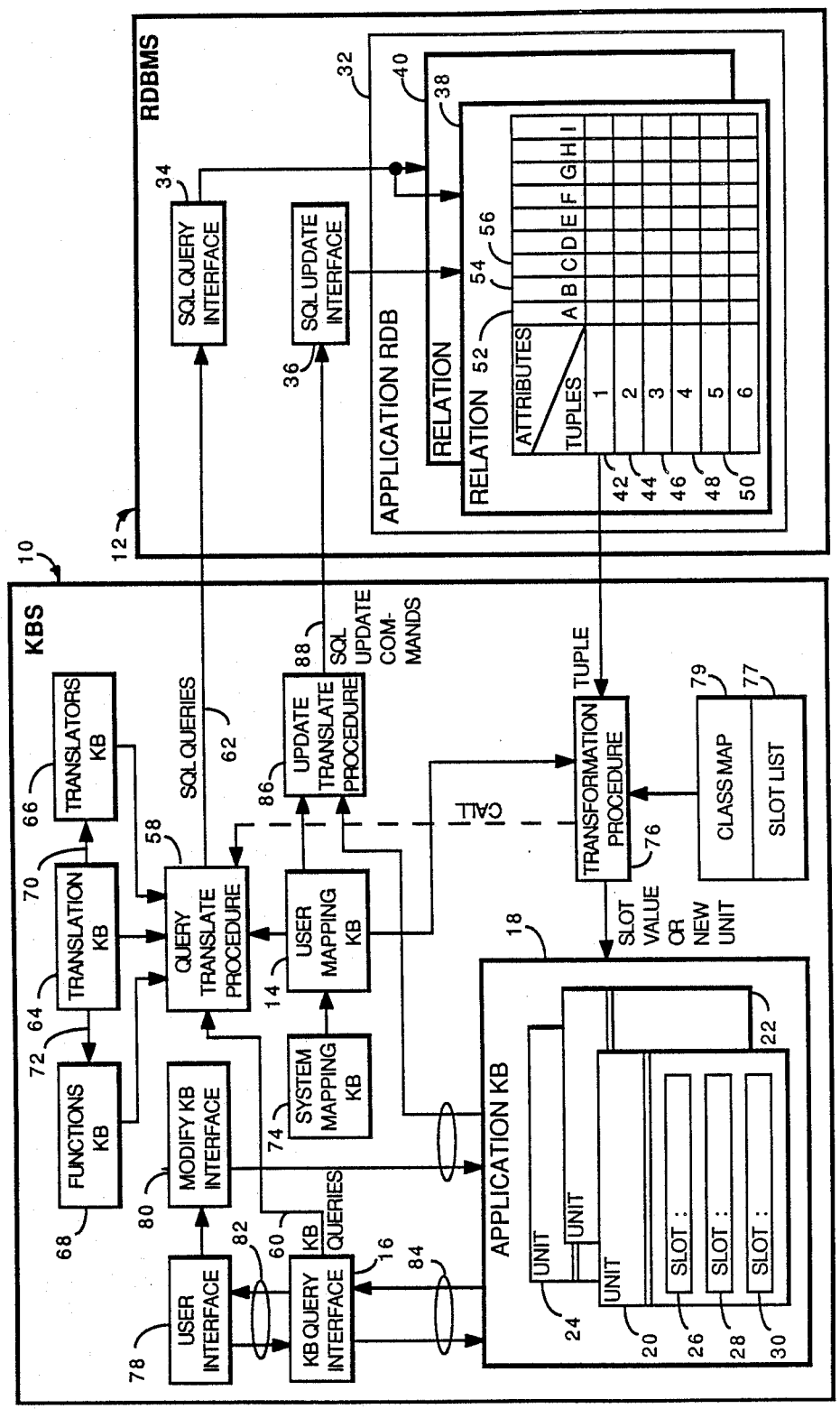
FIG. 1 is a block diagram of the structure of a knowledge-based system according to the invention in connection with an arbitrary relational database management system.

According to the invention, several new concepts are introduced to the field of knowledge-based systems (KBS) among which are slot maps and class maps, mapping knowledge bases, functions knowledge bases, a translation knowledge base and translators knowledge bases. An understanding of these terms will be helpful in an appreciation of this invention.

A slot map is a description of the mapping between a slot in a knowledge base (KB) and one or more attributes in a relational database (RDB).

A class map is a description of the mapping between a class in a knowledge base and one or more relations in a relational database.

A mapping knowledge base is a knowledge base which defines structures of class maps and slot maps.

A system mapping knowledge base is a knowledge base defining structures of all class maps and all slot maps. In other words, it is the vocabulary for all mapping knowledge bases. This system mapping knowledge base is useful for generalized knowledge-based systems and is particularly useful in the KEE[198] system product provided by IntelliCorp, Inc. of Mountain View, Calif.

A description of the knowledge bases, a listing of the units within the knowledge bases and a listing of the source code in the LISP language implementing three primary procedures and procedures employed in selected units in accordance with a specific embodiment of the invention are contained herein in the attached appendix.

The user mapping knowledge base is that knowledge base containing the structures of the user class maps and user slot maps which are constructed within the constraints defined by the system mapping knowledge base. Structures within the user mapping knowledge base which are not defined by the system mapping knowledge base are ignored unless provision is made for extending the functionality of the user mapping knowledge base in a particular instance to include the functionality from a translation knowledge base.

A translation knowledge base is a knowledge base containing class hierarchy information defining all the classes of the environment excluding the classes defined by the system mapping knowledge base. The class hierarchy information so defined is true across all relational database management systems. The translation knowledge base is a generalized vocabulary for taking queries and data contained in a knowledge base of an application (an application KB) and translating it into queries and data in a relational database of an application (an application RDB). The translation knowledge base described herein is complete except for trivial features which can be supplied by one of ordinary skill in the art.

The functions knowledge base is the knowledge base containing the members of classes in the translation knowledge base representing functions of the application KB (the "application KB functions").

The translators knowledge base is the knowledge base containing members of classes in the translation knowledge base representing the processes for mapping application KB functions to application RDB functions for each application RDB used with the application KB.

The translation knowledge base, the functions knowledge base and the translators knowledge base require only knowledge about the application RDB and the query language used with the application KB. Thus, the concept of querying an RDB can be separated from the problem of mapping the data of the application RDB into the application KB.

Description of the Mapping Knowledge Bases

The system mapping knowledge base and user mapping knowledge base are closely related. The system mapping knowledge base defines the structure or template for all user mapping knowledge bases. The user mapping knowledge base is tailored to the application knowledge base. Thus, the user mapping knowledge base represents the mapping between the relations and attributes of the application RDB and the units and slots of the application KB. Each pairing of an application RDB and an application KB will have its own user mapping knowledge base.

The structure of a system mapping knowledge base is quite general and can represent very complex mappings. In particular, a system mapping knowledge base can represent the mapping from multiple relations to a single class, the mapping from one relation to multiple classes, the mapping from multiple attributes of a relation to the value or values of a single slot, the mapping from one attribute of a relation to the values of multiple slots, the mapping of tuples of relations into member units organized into a multiple-inheritance taxonomy, and the transforming of attribute values into knowledge base units, numbers or strings, or more generally, any type of data structure supported by the LISP programming language.

Once a user has defined class maps and slot maps of a user mapping KB for a pairing of an application RDB and an application KB, the invention is capable of three functions:

First, it is possible to translate queries expressed in terms of predicates on knowledge base units and slots into queries expressed in terms of predicates on relational database relations and attributes.

Second, it is possible to transform the data retrieved from the application RDB by the above queries into units and slot values of the application KB.

Third, it is possible to translate modifications made to the units and slots in the application KB into relational database commands which make analogous modifications to the relations and attributes in the application RDB. In other words, it is possible to update the tuples (records) in a relational database by modifications to an application knowledge base. This becomes important wherever it is necessary to maintain a current database.

FIG. 1 illustrates the relationship between a knowledge-based system (KBS) 10 and a relational database management system (RBDMS) 12 and illustrates the role of a user mapping knowledge base 14. In FIG. 1, there is a representation of an application knowledge-based system 10, including a knowledge base query interface 16 and application knowledge base 18 comprising units 20, 22, 24 having slots 26, 28, 30. The RDBMS 12 has an application relational database RDB 32 and a structured query language database interface comprising a structured query language query interface 34 and structured query language update interface 36. The RDB 32 contains all of the data in relations 38, 40. Each relation consists of tuples 42, 44, 46, 48, 50, etc. described by values of attributes 52, 54, 56, etc.

The KBS 10 further comprises other knowledge bases and procedures. Functionally coupling the knowledge base query interface 16 to the SQL query interface 34 is a first translator or Query translate procedure 58 whereby knowledge base queries on path 60 are translated into structured query language queries on path 62. The translation is derived from a translation knowledge base 64, a translators knowledge base 66 and a functions knowledge base 68. The translators knowledge base 66 and the functions knowledge base 68 derive from the translation knowledge base 64 as indicated by the paths 70 and 72. The Query translate procedure 58 is coupled to receive application-specific mapping information from the user mapping KB 14. The Query translate procedure 58 uses the user mapping KB 14 to perform the translation functions. The user mapping KB 14 is derived from the system mapping KB 74.

A second procedure is the Transformation procedure 76. The Transformation procedure 76 is coupled to the user mapping KB 14 to receive application-specific mapping information for mapping the data retrieved from the application relational database 32 into units and slot values of the application knowledge base 18. The Transformation procedure 76 receives data contained in the tuples 42, etc. and transforms the data into units and slot values 20, etc. A conventional user interface 78 is provided for communicating with the KB query interface 16 and with a modify KB interface 80. (A KEE™-type interface may be used.)

Thus, a query in the knowledge base query language from the KB query interface 16 is addressed to the RDBMS 12 via the Query translate procedure 58 where it is translated into a structured query language query and addressed to the application RDB 32 containing the relevant tuples 42, etc. The tuples 42, etc. are transformed via Transformation procedure 76 into units 20, 22, etc. and slot values 26, 28, etc. in the application knowledge base 18 for further interpretation. Query may be made of the application KB 18 directly through the KB query interface 16 via bidirectional couplings 82 and 84.

A third procedure is the Update translate procedure 86. The user mapping knowledge base 14 provides the necessary mapping to a second translator called the Update translate procedure 86 between the application knowledge base 18 and the RDBMS 12. Specifically, once units and slot values of the application KB 18 have been updated, these updates can be translated via the Update translate procedure 86 into SQL update commands on path 88 to the RDBMS 12, addressed to the SQL update interface 36, which in turn updates the tuples 42, etc.

It should be understood that this knowledge base configuration and interconnection can be used with multiple databases so long as translators and transformers are provided between each RDBMS and the KBS. The caveat is that a query cannot be made which involves interaction of the databases with one another.

Class Maps

The user mapping knowledge base contains units herein referred to as "class maps". Each class map defines the mapping between a single class of the application knowledge base and a single "view relation" on the application relational database.

In relational database terminology, there are several recognized operations: select, project, product, union, intersect, difference, join, and divide. The result of performing any of these operations on one or more relations is yet another relation. Of these operations, three operations define the view relation used in accordance with the invention. The view relation is defined as the result of the join, the select and the project operations of a relational database. The join operation builds a relation from two specified relations consisting of all possible concatenated pairs of tuples, one from each of the two specified relations, such that in each pair the two tuples satisfy some specified condition. The select operation extracts specified tuples from a specified relation (not to be confused with the structured query language SELECT command or statement). The project operation extracts specified attributes from the specified relation.

A class map is illustrated with reference to FIG. 2. In FIG. 2, there is shown a sample of elements in a user mapping knowledge base which in this case, is an example of the user mapping knowledge base 14. The reason for focussing on class maps according to the invention is the ability to produce a correspondence between elements of a relational database and elements of a knowledge base. For example, in certain knowledge-based systems, it is possible to draw a one-to-one relationship between a relational database and a knowledge base. In the simplest example, a class in a knowledge base is equivalent to a relation in a relational database, the attributes of a relational database correspond to slots in a knowledge base, and the tuples in a relational database correspond to the member units in a knowledge base. Referring again to FIG. 2, a class map 100 has the following slots: Class.name 102, Covering.relation 104, UID.attributes (Unit identifier attributes) 106, Relations 108, Join.conditions 110, Member.conditions 112, Slot.-maps 114, Pname.slot.map 116, UID.name! 118, UID.-name.inversion! 120 and Deletable.member.units.p 122. Of these slots, Relations 108, Join.conditions 110, Member.conditions 112 and Slot.maps 114 are for storing explicitly the names of the relations, the joins, the selection constraints and the names of the projected attributes, respectively, of the view relation. In this example, the class map SALES.FORCE-CM defines the mapping between the class SALES.FORCE in the Personnel application knowledge bas and the view relation resulting from the join of the Employees relation and the Salaries relation, the selection of tuples whose value of the attribute Dept (Department) is "Sales", and the projection of the attributes Empno (Employee Number), Name, Address, Salary and Bonus.

Figure 8:
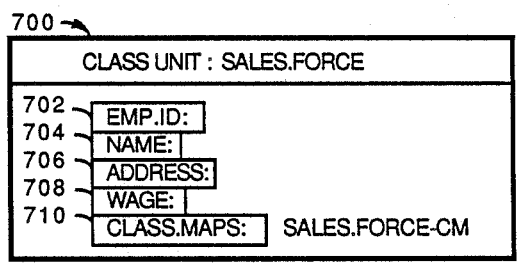
FIG. 8 illustrates the structure of a specific class unit in the application knowledge base illustrating an example of the invention.

FIG. 8 illustrates the structure of the class unit 700 named SALES.FORCE. The class unit SALES.-FORCE 700 contains slots Emp.Id 702, Name 704, Address 706, Wage 708, Class.Maps 710. The class unit 700 could be one of the units 20, 22, 24, etc. in the application KB 18 (FIG. 1) or alternatively, one of the Classes A through F in the taxonomy 448 in FIG. 5 hereinafter explained.

In addition, the class map 100 contains slots which are for containing cached information. In the example given, these slots are: Member.conditions.relations 124, Member.conditions.joins 126, Pname.relations 128, Slot.map.partitions-first 130, Slot.map.partitions-rest 132, Slot.map.partitions.local-first 134 and Slot.map.-partitions.local-rest 136.

Attached to each of the slots in class map 100 are values represented by terms of a particular format. The terms in the format shown are merely examples. For example, a value in slots containing relations 104, 108, 124 and 128 are represented in the format:

(relation name . relation alias) as a pair, where "relation alias" is a user-defined abbreviation for "relation name." A value in slots containing attributes 106, 110, 112, 114, 116 and 126 is represented in the format:

(relation alias . attribute name) as a pair. A value in slots containing joins 110, 114, 116 and 126 is represented as a pair of attributes with an implied "equals" predicate between the attributes. And a value in a slot containing the member conditions 112 is represented as a predicate on attributes and constants. (In FIG. 2, comments are surrounded by angle brackets.) Those of ordinary skill will recognize that the class map of FIG. 2 is based on the LISP list structure from the LISP programming language.

A class map as in FIG. 2 specifies how each tuple of a view relation maps into a single member unit of the subject class of the application knowledge base. The name of the class is the value in the Class.name slot 102. In this example (FIG. 2), the name of the subject class is SALES.FORCE.

More than one tuple may map into the same member unit. One or more attributes of the view relation are specially designated by the mapping knowledge base developer as the UID.attributes 106 in order to identify which member unit a given tuple maps into. The values of these attributes in a tuple, called the user identifier or UID (not shown in the figure) of the tuple of the relational database, are assumed to identify uniquely a single member unit. Thus in the simplest case, one tuple maps into one member unit. The UID identifies the specific member unit. The transformer 76 includes code which assures that tuples from the same view relation and with the same UID always map into the same unit of the application knowledge base and that tuples with different UIDs always map into different units. The UID information found in the class map is vital to the correct operation of the transformer 76.

Referring to FIG. 3, there are shown two simple relations 200 and 202 from a relational database and one resulting view relation 204 which is a join of the two simple relations 200 and 202. The first relation 200 is labelled Employees. The second relation 202 is labelled Salaries. The view relation 204 is the join of the first relation 200 and the second relation 202 joined on the attribute Empno 206. In this view relation 204, the selection constraints extract the rows whose Dept attribute 208 has the value "Sales", and the projection eliminates the attribute Dept 208. Also in this view relation 204 the UID is the value of the attribute Empno 206, which is unique for each member unit of the application knowledge base.

FIG. 4 illustrates a member unit 300 of an application knowledge base. The member unit 300 is assigned a name by the transformer 76 in accordance with the invention. A typical name 302 might be SALES.FOR-CE$(12) where 12 is the UID value from the UID attribute Empno 206 (FIG. 3). Within that member unit are the slots, for example, Emp.Id 304, which has the value "12", Name 306, which has the value "John", Address 308, which has the value "Palo Alto", Wage 310, which has the value "1020" (in dollars), and $Print.name$ 312, which also has the value "John".

In accordance with the invention, the mapping between the UID value and the member unit 300 is represented in the member unit name 302. Ideally, UIDs are unique across all view relations. The value of the UID.-name! slot 118 is a LISP function which is used to compute the member name 302 for each member unit 300. The value of the UID.name.inversion! slot 120 is the LISP function which computes the UID given a member name (for example member unit name 302). This is extremely useful for querying and updating the application relational database.

Each user mapping knowledge base 14 contains many class maps. Each of the class maps, however, has the same structure as the CLASS.MAPS class of the system mapping KB 74.

Referring to FIG. 5, there is shown a taxonomy 448 of an application knowledge base 18 having classes A through F designated 400, 402, 404, 406, 408 and 410, respectively, arranged in a taxonomy of multiple-inheritance. Class maps are arranged in the same multiple-inheritance taxonomy as the application KB 18.

In FIG. 6, there is shown the class map taxonomy 550 of the class maps of a user mapping knowledge base 14 comprising class maps A through F designated 500, 502, 504, 506, 508 and 510, respectively. When a class map is itself a subclass of another class map, its member conditions comprise the member conditions inherited from its parents and any additional local member conditions which distinguish that class map from its sibling class maps. Member conditions are expressed as predicates (Boolean functions) on the attributes in the view relation, as for example, in the view relation 204. For example, the Member.conditions 112 (FIG. 2) restrict Dept 208 to be the "Sales" value, so the employee with Dept 208 having value "Research" does not appear in the view relation 204.

While this invention has general application, the implementation of the invention can be rendered more efficient and less complex by imposing a single restriction on the view relation. The restriction, which normally is the case, is that one of the base relations forming the source of the view relation of the relational database contains at least one tuple for every member unit of the class in the application knowledge base. (In the present terminology, one of the base relations is thus a "covering relation" 104.) By employing this restriction, it becomes unnecessary to take the union of base relations (a relational database operation) when retrieving all of the member units of a class in the application knowledge base. Nevertheless, a straightforward extension of the preferred implementation of the invention is to remove the restriction that all view relations have a covering relation.

Referring again to FIG. 2, slots 102, 104, 106, 108, 110, 112, 114, 118 and 120 have been explained previously. The remaining slots of a class map 100 are described briefly below:

The Deletable.member.units.p slot 122 is a Boolean flag indicating if deleting a member unit should cause the corresponding tuple or tuples on the database to be deleted also. The Pname.slot.map slot 116 is the slot map for the $Print.name$ slot 312, which is a special slot containing the print name of the member unit which is used for output displays.

The Pname.relations slot 128 is a cache which contains the relation or relations referenced in the Pname.slot.map slot 116.

The Member.conditions.joins slot 126 is a cache which contains the joins needed to connect the value in the Covering.relation slot 104 with the relations referenced in the Member.conditions slot 112.

The Member.conditions.relations slot 124 is a cache containing the relations referenced in the Member.conditions.joins slot 126.

Four slots are closely interrelated, namely, Slot.map.partitions-first 130, Slot.map.partitions-rest 132, Slot.map.partitions.local-first 134 and Slot.map.partitions.local-rest 136. These slots are caches which are derived from the Slot.maps slot 114. The values of these slots enable efficient generation of the queries in the structured query language for retrieving the values of slots of members of the class whose name is the value of the slot Class.name 102. In this example, the class is SALES.FORCE in the application knowledge base 18 called Personnel.

Slots 130 and 132 have as values a mathematically complete and disjoint partition of the slot maps in the Slot.maps slot 114. Slots 134 and 136 have as values a mathematically complete and disjoint partition of the slot maps in the Slot.maps slot 114 which represent local slots of the class whose name is the value of the slot Class.name 102. The partitions of these four slots 130, 132, 134 and 136 are computed as follows:

(1) For each slot map in the Slot.maps slot 114, a partition is created containing the slot name and the relations needed by the slot map.

(2) All partitions which depend only on the value of the Covering.relation slot 104 and/or the value in the Member.conditions.relations slot 124 are merged, and the result is placed in the slot named Slot.map.partitions-first 130.

(3) From the remaining partitions computed under step 1, the partitions which depend on exactly the same relations are merged, and the results are placed in the slot named Slot.map.partitions-rest 132.

The above process is repeated for the values of the slot maps which represent the slots which are local to the class whose name is in Class.name 102 with the resulting partitions stored in the slots Slot.map.partitions.local-first 134 and Slot.map.partitions.local-rest 136. Each such partition has the following format: ([list of the relation aliases]. [list of slot names]).

To retrieve all of the slots for a particular unit, it is only necessary to run one query for each partition. Due to limitations on the implementation of most relational database management systems, it is not universally possible to run a single query which retrieves all of the slots. The above method overcomes the problem using the tools available in the knowledge-based system according to the invention.

Slot Maps

A slot map describes how the value or values of a particular slot for a particular member unit are computed from the value or values of a field or fields of a tuple. There is one slot map for each slot of the class represented by a class map. If more than one tuple maps into a particular member unit, then the additional tuples provide additional slot values, i.e., the slots have multiple values.

Figure 7:
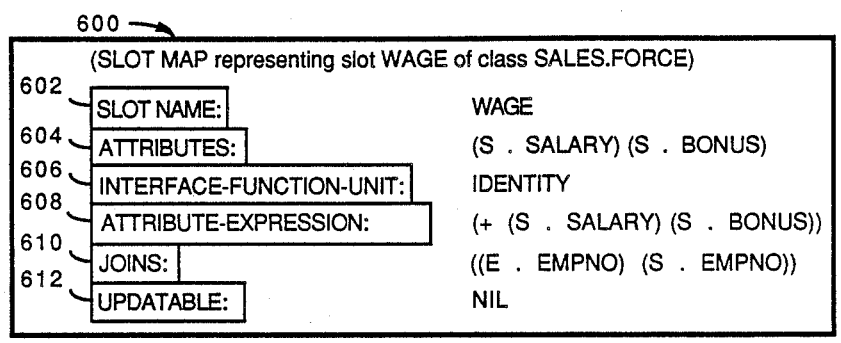
FIG. 7 is a slot map of a user mapping knowledge base illustrating an example of the invention.

Referring again to FIG. 2, there is shown a Slot.maps slot 114 listing four slot maps in the class map 100. Referring to FIG. 7, there is a representation of the fourth slot map with name Wage from the Slot.maps slot 114. This slot map 600 contains entries ("fields" without the full characteristics of slots in one embodiment or in an alternative embodiment slots wherein each slot map is a unit which contains slots). The entries are Slotname 602, Attributes 604, Interface-function-unit 606, Attribute-expression 608, Joins 610 and Updatable 612. The Slotname 602 is the name of a slot 708 in the class SALES.FORCE 700.

Attributes 604 contain the attribute or attributes whose value or values in a tuple are needed to compute the value or values of the slot. Interface-function-unit 606 contains the value "IDENTITY", referring to a unit in the translation KB 64. Together, the Interface-function-unit 606 and the Attribute-expression 608 indicate how the slot value is computed. Joins 610 contain the joins needed to connect the relations containing the attributes of the slot map to the covering relation of the class map. Updatable 612 is a flag indicating if the attributes upon which this slot is based can be updated. If they can, then changing the value or values of the slot will change the corresponding attribute value or values on the relational database 32.

There are two types of slot maps, one where the slot values are computed by the relational database 32 and one where the slot values are computed by the user mapping knowledge base 14. For database-computable slot values, the value in the Interface-function-unit 606 (FIG. 7) is a unit with an associated structured query language function for coercing database data of one type into database data of another type, e.g., a structured query language function which coerces numbers into strings. The structured query language function uses as its argument the SQL translation of the value in the Attribute-expression 608. Such interface function units are called "simple interface-function-units."

For knowledge-base computable slot values, the unit identified by the Interface-function-unit 606 includes a slot whose value is a LISP function. This LISP function can be applied to the values of the slot map Attributes 604 retrieved from the RDB 32 (FIG. 1) to produce the slot values. Such units are called "LISP interface-function units." Herein the user mapping knowledge base computes the slot values.

Furthermore, there is a third type of slot map wherein database-computed slot values and knowledge base-computed slot values are combined in a single slot map. In this hybrid slot map, the value in Attribute-expression 608 is computed on the RDB 32 from attribute values and then are supplied to a LISP function in the user mapping knowledge base 14, from which are computed corresponding slot values.

Transformation

In FIG. 1, a Transformation procedure 76 is provided for converting tuples of a relational database 32 into slot values or new units in the application knowledge base 18. In fact, in accordance with the invention it is merely required that a query be provided to the RDBMS 12 from any source in order to generate output to be applied to the Transformation procedure 76 and in order to return information to the application knowledge base 18. According to the invention, the Transformation procedure 76 is a general procedure which works with any user mapping knowledge base 14. However, the Transformation procedure 76 does require as input, in addition to a tuple from the application RDB 32, a list of slots 77 and a class map 79 (FIG. 1), so that the Transformation procedure 76 knows how to handle the tuple input. The slot list 77 and class map 79 may be provided in any manner, including through the user interface 78 directly or as a result of the query of the Query translate procedure 58.

The Transformation procedure 76 is the conceptual expression of several procedures. The Transformation procedure 76 comprises a Download tuple procedure, also known as a Download class tuple procedure, in a specific embodiment. It uses a Compute slot values procedure. Broadly, the Download tuple procedure takes tuples of information from an arbitrary RDB 32, transforms the tuples into slot values and directs the slot values to slots in member units of the application knowledge base 18. If the addressed member unit does not yet exist, the Download tuple procedure creates that unit as needed and then the slot value or values of the new unit.

Figure 9:
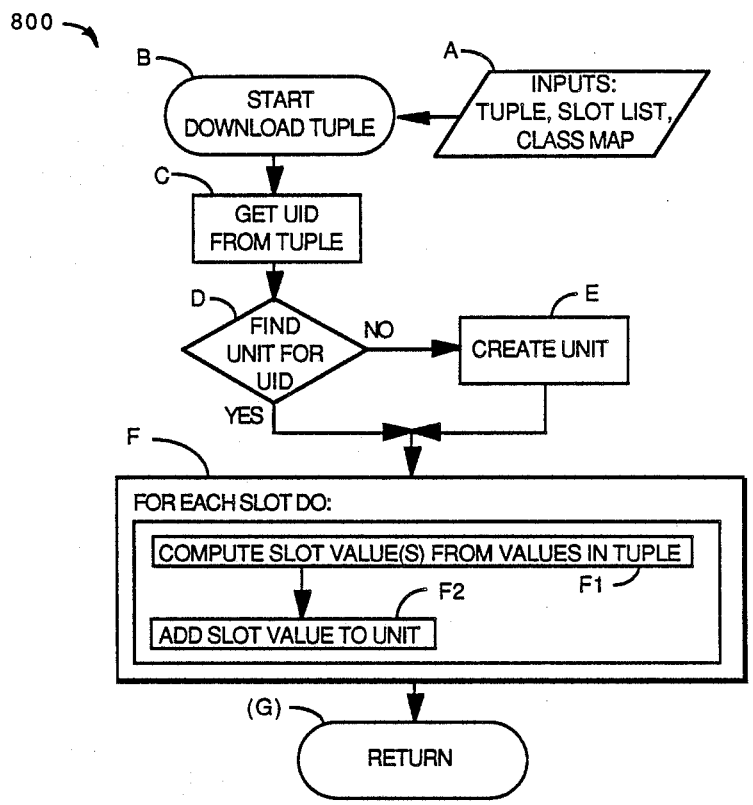
FIG. 9 is a flow diagram for a Download tuple procedure of the Transformation procedure in accordance with the invention.

Referring to FIG. 9, there is shown a flow diagram for the Download tuple procedure 800. The Download tuple procedure 800 takes as its inputs a database tuple 42, a slot list 77 and a class map 79 (FIG. 1) (Step A and Step B). The Download tuple procedure 800 first extracts the UID from the UID.attributes field of the tuple 42 (Step C). The UID attributes field would be, for example, the Empno 206 in FIG. 3. The procedure 800 then searches the application KB 18 for a unit whose name corresponds to the retrieved UID (Step D). If no such unit exists, the procedure creates a new unit (Step E). If such a unit exists, the procedure immediately proceeds to the next step. The next step includes the computation of the slot value from the values in the tuple (Step F1) and the addition of the slot values so computed to the existing or newly created unit (Step F2). This step is carried out for each slot in the slot list 77 (Step F). Thus is the procedure completed (Step G).

Figure 10:
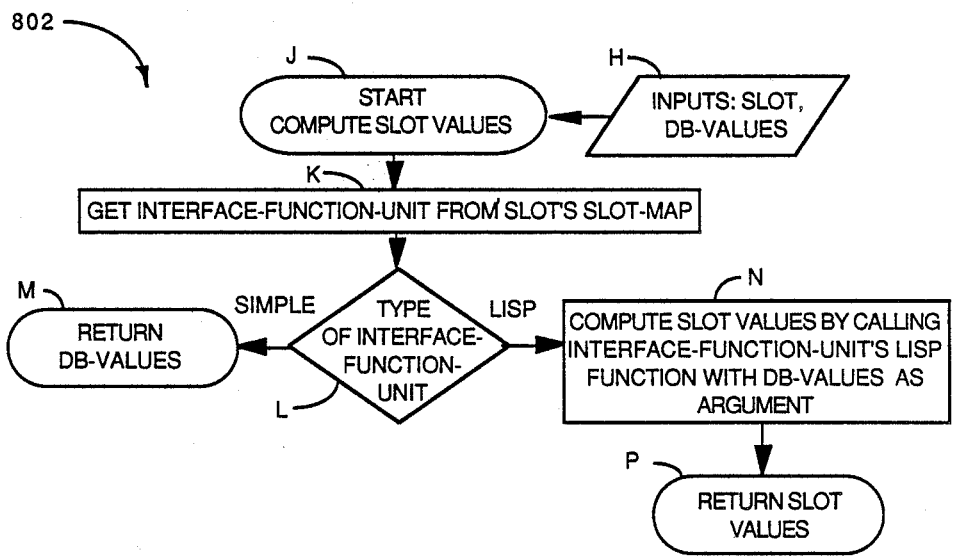
FIG. 10 is a flow diagram of the Compute slot values procedure corresponding to Step F1 of FIG. 9.

FIG. 10 is a flow diagram of the procedure Compute slot values 802 corresponding to Step F1 of FIG. 9. The Compute slot values procedure 802 takes as inputs a slot listed in the slot list 77 and one or more values computed by the RDB 32 (Steps H and J). Next, the procedure 802 gets the Interface-function-unit from the slot map describing the slot listed on the slot list 77 (Step K). If the Interface-function-unit is of the class of "simple" interface function units (i.e., the slot is a database-computable slot), then the procedure simply returns the database values (Step L to Step M). If the Interface-function-unit is a LISP type of interface function unit (i.e., the slot is a knowledge base-computable slot), then the procedure 802 gets the LISP function attached to the Interface-function-unit and calls that function with the database values as arguments (Step L to Step N). The procedure 802 returns the values slot values computed by the function to the calling procedure, or as otherwise directed (Step P).

The above procedures 800 and 802 are used by all other procedures in order to transform data into slot values in units. Thus, these procedures are general.

Figure 11:
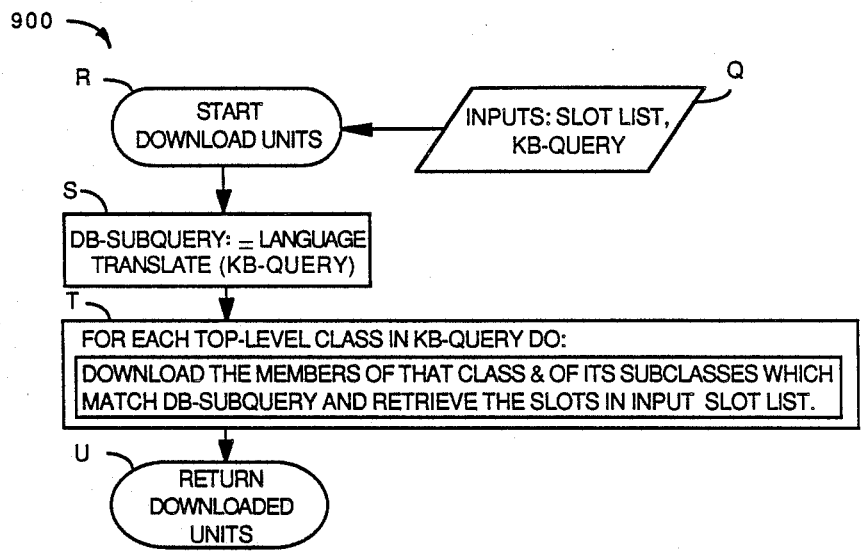
FIG. 11 is a flow diagram of the procedure Download units, which is one of the procedures forming a part of the Query translate procedure.

In order to execute a specific query and retrieve information in the general case, it is necessary to execute a query which is understood by the application knowledge-based system 10. This involves, for example, the use of procedures from the Query translate procedure 58 (FIG. 1). FIG. 11 is a flow diagram of the procedure Download units 900, which is one of the procedures forming a part of the Query translate procedure 58 and which assures that a query is generated and a transformation is performed on the returned data.

Referring to FIG. 11, the Download units procedure 900 takes as its inputs the KB-query and a list of slots to be retrieved (slot list) (Steps Q and R). The procedure then calls the Language translate procedure 1200 (FIG. 14 hereinbelow) to return a structured query language query to temporary storage in DB-subquery (Step S). This query, if executed on the RDB 32, returns the UIDs of the member units which satisfy the query. However, it is desired to obtain all member units which satisfy the query and the values of the slots listed in the slot list from Step Q. Therefore, for each top-level class in the input query KB-query from Step Q, the procedure 900 calls the Download class members procedure 1000 (FIG. 12 hereinbelow), which creates the units (transformed from tuples from the RDB 32 satisfying the DB-subquery) which satisfy the KB-query (Step T). The procedure 900 then returns the downloaded units listed (Step U).

Figure 12:
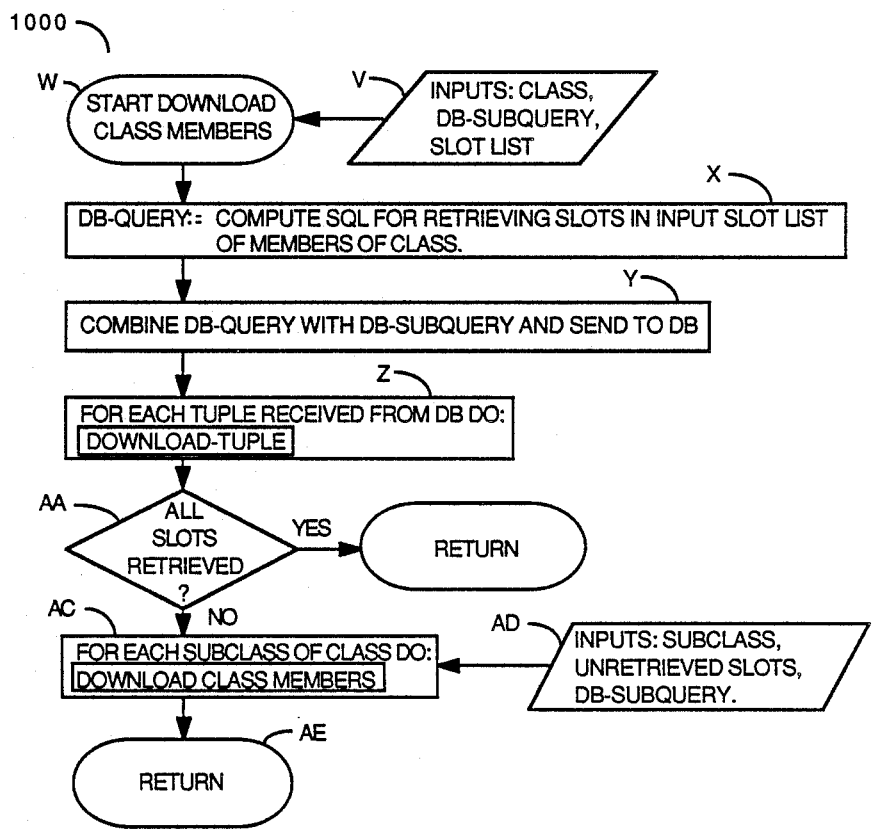
FIG. 12 is a flow diagram of the Download class members procedure corresponding to Step T of FIG. 11.

Referring now to FIG. 12, there is shown a flow diagram of the Download class members procedure 1000 corresponding to Step T of FIG. 11. The Download class members procedure 1000 takes as inputs the class, DB-subquery and the slot list passed to procedure 900 (Steps V and W). Its purpose is to search the RDB 32 for the tuples comprising the members of the subject class which satisfy the DB-subquery, to create new units in the application KB 18 for those tuples which have no corresponding units in the application KB 18, and finally to create the slot values in all units for the slots given in the slot list. The Download class members procedure 1000 calls the Compute SQL for slots procedure 1100 (FIG. 13) to produce the structured query language query for retrieving the values of the slots given in the slot list for the members of the subject class (Step X). This single value (a structured query language query) is stored in the temporary storage DB-query. Then the DB-query and the DB-subquery (from Step S) are combined into a single structured query language query and sent to the SQL query interface 34 (FIG. 1) (Step Y). The RDB 32 returns the matching tuples. For each tuple returned from the RDB 32, the Transformation procedure 76 is called and, more specifically, the Download tuple procedure 800 (FIG. 9) is called (Step Z). The procedure 1000 checks to determine if all slots have been retrieved (Step AA). If they have, then it returns to the Download units procedure 900 (Step AB). If not, then the procedure becomes recursive, calling the Download class members procedure 1000 for each subclass of the subject class, with inputs Subclass, Unretrieved slots of the slot list, and the outstanding DB-subquery (Steps AC, AD). When the recursive procedure is completed, it returns to the Download units procedure 900 at Step T (Step AE).

Figure 13:
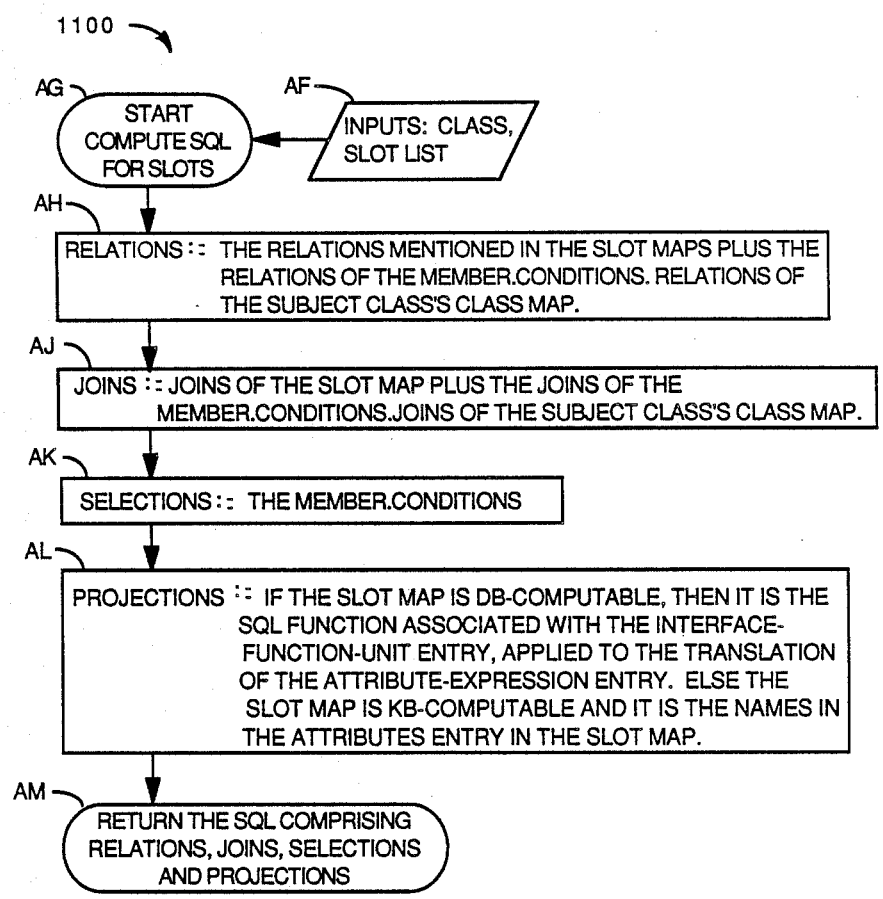
FIG. 13 is a flow diagram describing the procedure Compute SQL for slots corresponding to Step X of FIG. 12.

Referring now to FIG. 13, there is shown a flow diagram for the procedure Compute SQL for slots 1100. This procedure computes the select, join and project operations of the RDBMS 12 based on the class map of the input class (the subject class) and the input slot list. Its purpose is to return the structured query language query for retrieving the slots named in the slot list. The procedure 1100 takes as inputs the class and the slot list (Steps AF and AG). It computes in any order the relations, the joins, the selections and the projections (Steps AH, AJ, AK, AL). The relations are computed by combining the relations mentioned in the slot maps (one slot map is obtained for each slot in the slot list) with relations contained in the Member.conditions.relations slot 124 (FIG. 2) of the class map of the subject class (Step AH). The relations mentioned in a slot map have no corresponding entry in a slot map and so must be computed from the entries in the slot map labelled Attributes and Joins. The joins are computed by combining the entry in the slot map labelled Joins with the joins of the Member.conditions.joins slot 126 (FIG. 2) of the class map of the subject class (Step AJ). The selections are the contents of the Member.conditions slot 112 (FIG. 2) of the class map of the subject class (Step AK). The projections are computed for each slot map, based on whether the slot map is database-computable or knowledge base-computable (Step AL). In a specific example, if it is database-computable, the projection is the structured query language function associated with the Interface-function-unit entry 606 applied to the SQL translation of the value in the Attribute-expression entry 608 (FIG. 7). If it is knowledge base-computable, it is simply the names in the Attributes entry 604 of the slot map 600 (FIG. 7). The procedure 1100 returns the structured query language query comprising the relations, joins, selections and projections (Step AM).

Figure 14:
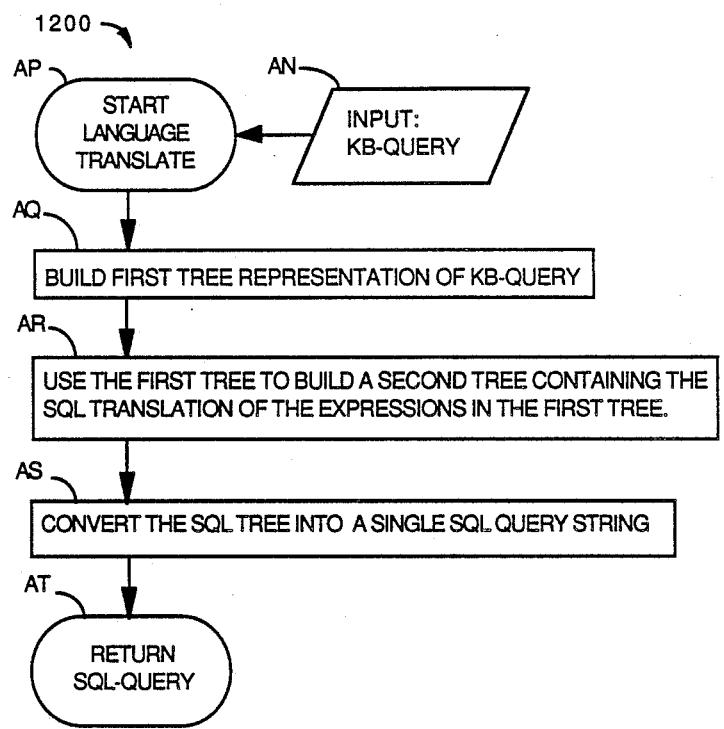
FIG. 14 is a flow diagram describing the Language translate procedure corresponding to Step S of FIG. 11.

FIG. 14 is a flow diagram describing the Language translate procedure 1200 (Step S of FIG. 11). In a particular embodiment, the Language translate procedure 1200 takes as input a knowledge base query expressed in a specific query language, such as TellAndAsk ™ from IntelliCorp, Inc. of Mountain View, Calif., and translates it into a structured query language query, such as the ANSI standard SQL structured query language (or more specifically according to the SQL structured query language from IBM of Armonk, N.Y. and the dialects of the SQL structured query language from Oracle, of Belmont, Calif. and Britton-Lee of Los Gatos, Calif.). A TellAndAsk query is a predicate calculus for forming a Boolean expression which is a combination of predicates applied to variables whose values may be units or slot values. The purpose of the Language translate procedure 1200 is to return an equivalent database query in a structured query language.

Referring to FIG. 14, the Language translate procedure takes as input the TellAndAsk knowledge base query (Steps AN and AP) and builds a first tree representing the knowledge base query (Step AQ). This is a function which is built relatively easily in the KEE language. Users may build their own function in languages supporting other knowledge-based systems. The leaves of the tree are (1) predicates or functions applied to variables, hereafter "expressions", or (2) assignments of variables. Each variable is assigned a list of one or more types. A type is either a string, number, symbol, list, etc. (simple data type) or a class name. A class name type indicates that the value of a variable must be a unit which is a member of the named class.

Thereafter, the first tree is used to build a second tree of structured query language translations of the expressions from the first tree (Step AR). To perform the translations, the procedure uses the translation KB 64, the user mapping KB 14, the functions KB 68 and the translators KB 66.

The functions KB 68, referred to in a specific embodiment as the KC Functions KB, contains one member unit, called a function unit, for each KB predicate or function. Typical member units represent (=) the equals predicate, (+) the plus function, (−) the minus function, and so forth.

The translators KB 66, referred to in a specific embodiment as the ANSI_SQL KB, typically contains one member unit, called a translator unit, for each member unit in the functions KB 68. Each of the translator units contains the information needed to translate a KB predicate or function into a structured query language predicate or function. If a specific KB predicate or KB function translates into a plurality of DB predicates or DB functions, depending on the computed types of the arguments, then there will be one translator unit for each possible translation of a KB predicate or KB function. The computed types of arguments are taken from the first tree (Step AQ). The translators KB 66 also contains member units which can be used as the value of the Interface-function-unit 606 of any slot map (example slot map 600 FIG. 7). These member units are application-independent interface-function-units. The end user or programmer can define additional application-specific member units which may be added to the translators KB 66 or the user mapping KB 14.

The translation KB 64 contains a taxonomy of classes defining the structure of the member units in the functions KB 68, the structure of the member units in the translators KB 66 and the structure of interface-function-units in the user mapping KB 14, as well as other units as needed.

Continuing with a description of the Language translate procedure 1200, the second tree is converted into a single structured query language query string (Step AS) which is returned for use by the RDBMS SQL query interface 34 (Step AT).

Figure 15:
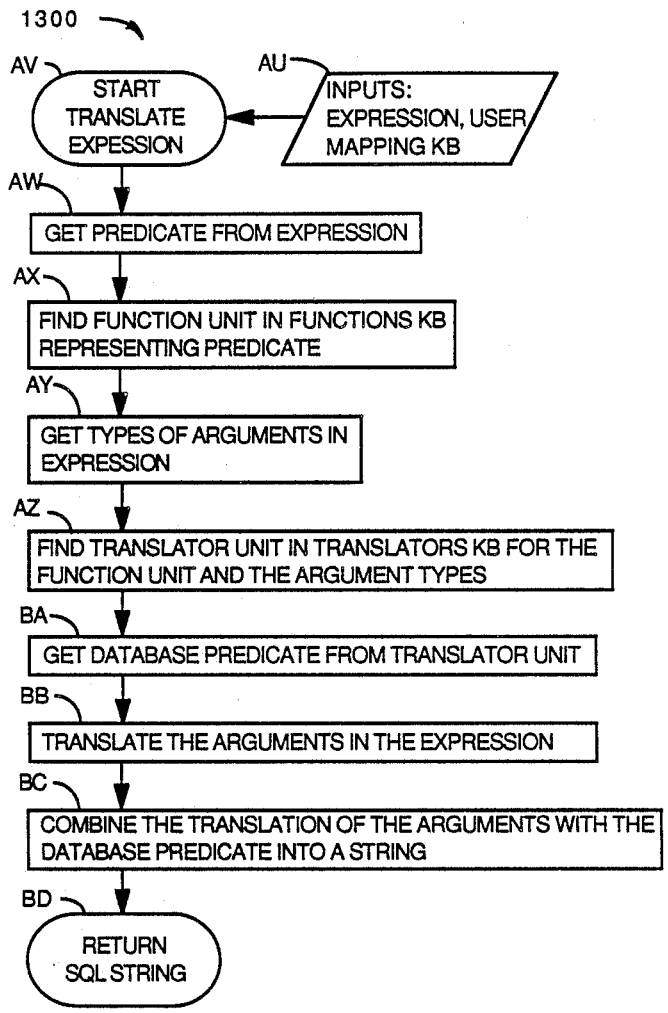
FIG. 15 is a flow diagram describing the Translate expression procedure corresponding to Step AR of FIG. 14.

FIG. 15 is a flow diagram describing the Translate expression procedure 1300 or how to use the function units and the translator units from the functions KB 68 and the translators KB 66 to translate an expression of a KB query into a structured query language string forming a DB query. The Translate expression procedure 1300 starts with the inputs expression from the KB query, and the current user mapping KB 14 (Steps AU and AV), gets the predicate from the input expression (Step AW) and finds the function unit in the functions KB 68 which represents the predicate (Step AX). Thereafter, the procedure gets the types of the arguments in the expression (Step AY) and uses the types to find the translator unit in the translators KB 66 for the function unit (Step AZ). Thereafter, the procedure gets the database predicate from the translator unit in the translators KB 66 (Step BA) and translates the arguments in the expression using the user mapping KB 14 (Step BB). Finally, the procedure combines the translation of the arguments with the database predicate (of Step BA) to form a structured query language string (Step BC) which is returned to the Language translate procedure 1200 (Step BD).

Updating the database typically involves respect for certain conditions limiting the scope of the update. While class maps and slot maps allow very general mapping of information in a relational database to a knowledge base, relational databases are not able to accept information of the same richness as is found in a knowledge base. In particular, there must be a one-to-one correspondence between a slot value and the value or values of one or more attributes in a tuple.

The following procedures 1400, 1500 and 1600 comprise the update translate procedure 86.

Figure 16:
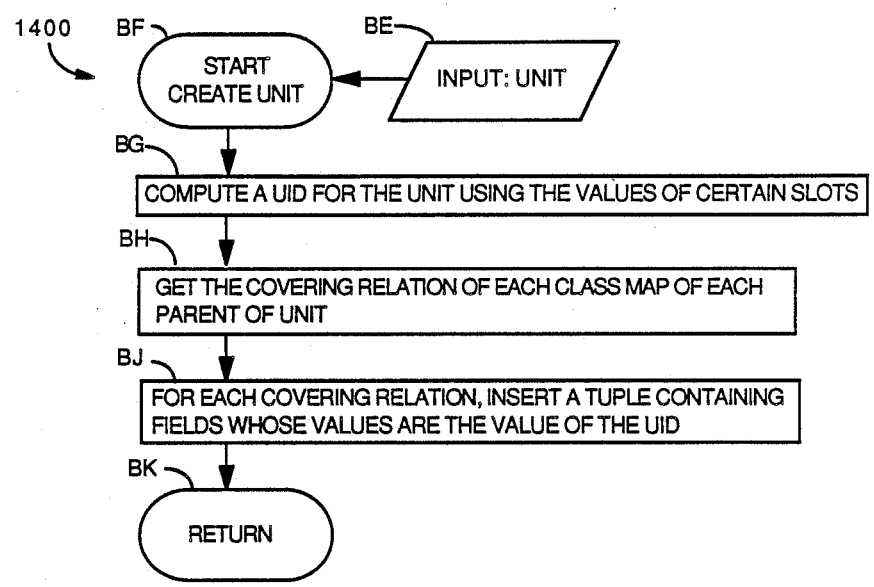
FIG. 16 is a flow diagram describing the Create unit procedure. 15

FIG. 16 is a flow diagram describing the Create unit procedure 1400 for adding information to the RDB 32 based on information contained in a unit existing in the application KB 18. The Create unit procedure 1400 starts with a unit from the application KB 18 as its input, or in other words with a pointer to an object in the application KB 18 which contains a full description of the unit to be processed (Steps BE and BF). Thereupon the procedure computes the values of the UID attributes 106 to be stored in the application RDB 32 (Step BG). The value is computed from the values of specific slots in the unit which correspond one-to-one with the UID attributes. Next the procedure gets the value of the Covering.relation slot 104 of each class map of each parent of the subject unit (Step BH). Finally, for each covering relation value, the procedure inserts a tuple in the corresponding relation in the application RDB 32 containing fields whose values are the values of the UID attributes 106 (Step BJ). The procedure returns to the calling procedure (Step BK).

Figure 17:
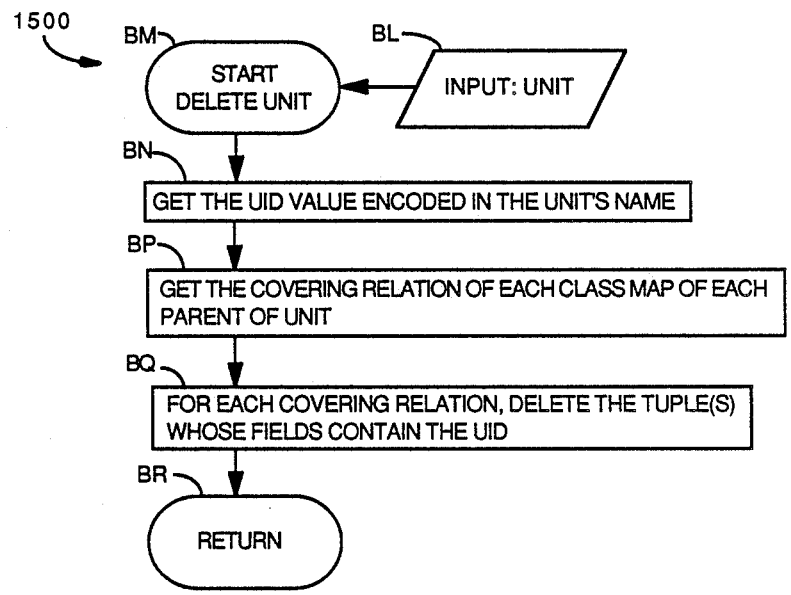
FIG. 17 is a flow diagram describing the Delete unit procedure.

FIG. 17 is a flow diagram describing the Delete unit procedure 1500 for deleting information from the RDB 32 based on information contained in a unit to be deleted in the application KB 18. The Delete unit procedure 1500 starts with a unit from the application KB 18 (Steps BL and BM). The procedure then extracts the values of the UID attributes from the name of the unit, since the name of the unit contains the UID and usually the name of a parent of the unit (Step BN). Next the procedure gets the value of the Covering.relation slot 104 of each class map of each parent of the subject unit (Step BP). Finally, for each covering relation value, the procedure deletes the tuple or tuples in the application RDB 32 containing fields whose values are the values of the UID attributes 106 (Step BQ). The procedure returns to the calling procedure (Step BR).

Figure 18:
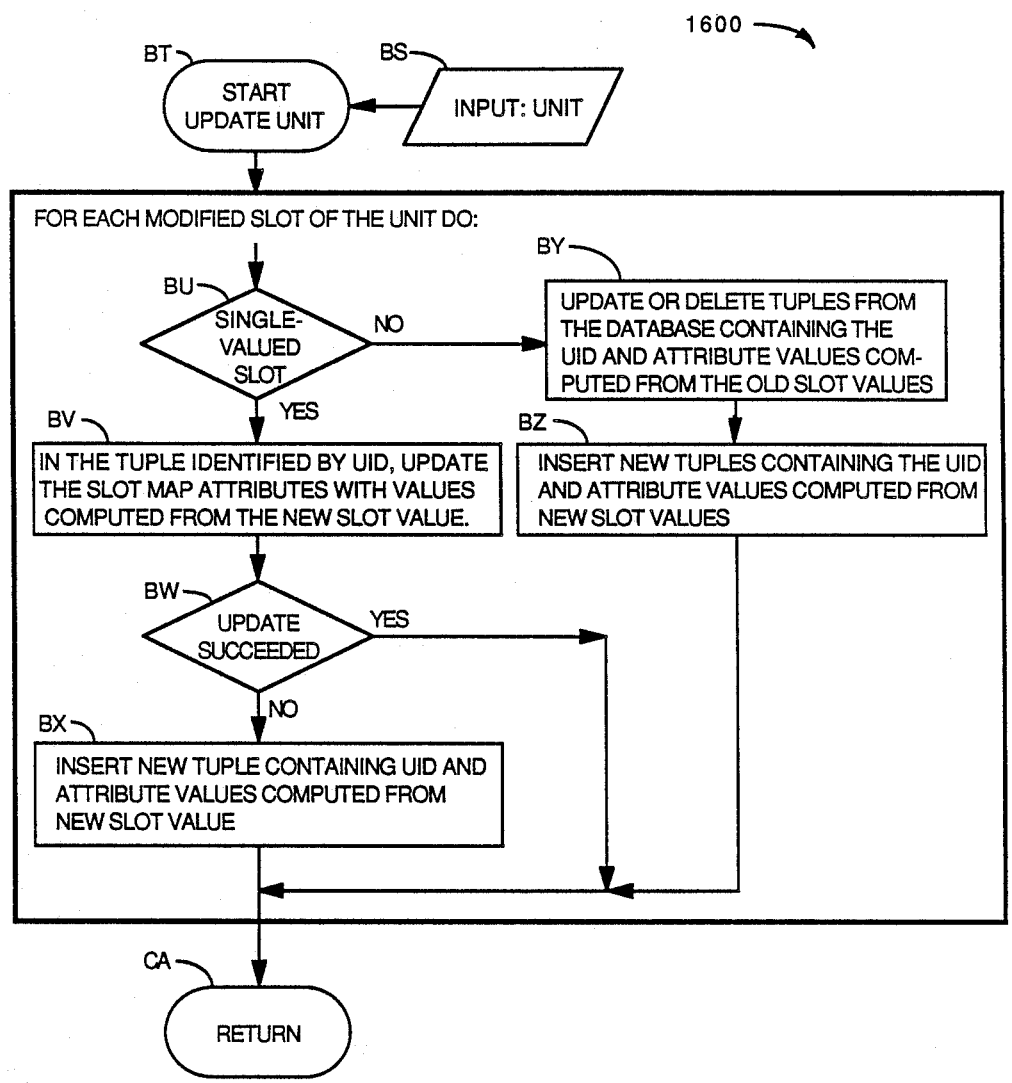
FIG. 18 is a flow diagram describing the Update unit procedure.

FIG. 18 is a flow diagram describing the Update unit procedure 1600 for updating information in the RDB 32 based on information contained in a unit in the application KB 18. The Update unit procedure 1600 starts with a unit from the application KB 18 as its input, or in other words with a pointer to an object in the application KB 18 which contains a full description of the unit to be processed (Steps BS and BT). The procedure then performs a repetitive subprocedure for each slot in the unit which has been modified by the user. Specifically, the procedure tests to determine if the slot is single-valued (Step BU). If it is single-valued, then the procedure updates the attributes in the tuple identified by the UID, which attributes correspond to the slot map Attributes entry (Step BV). This step implies generating the structured query language command to perform an update and transmitting the command to the RDBMS 12. The new attribute values are computed from the current slot value. The procedure then tests to determine if the update succeeded on the RDB 32 (Step BW). If the update succeeded, then the procedure continues for the next slot. If the update did not succeed, then the procedure inserts a new tuple in the RDB 32, where the new tuple contains the UID (values of the UID attributes) and the attribute values computed from the new slot value (Step BX). The procedure then continues for the next slot.

If the slot is not single-valued, then the procedure deletes or updates those tuples from the RDB 32 which contain the UID and attribute values computed from the previous slot values (Step BY). Finally, the procedure inserts a new tuple in the RDB 32 for each slot value, where the new tuple contains the UID (values of the UID attributes) and the attribute values computed from the new slot value (Step BZ). The procedure then continues for the next slot. When all modified slots have been considered, the procedure returns to the calling procedure (Step CA).

The invention thus allows for querying and updating an arbitrary relational database using the versatile tools of a knowledge-based system based on the use of a generalized mapping knowledge base and generalized translation and transformation procedures, which are adapted for use with a specific application knowledge base through a user mapping knowledge base tailored to the application knowledge base. The invention has been explained with respect to specific embodiments. Other embodiments will be apparent to those of ordinary skill in this art in light of this specification. For example, the user mapping knowledge base may be integrated into the application knowledge base without loss of generality of application of the invention. Similarly, the various individual procedures can be integrated into a single generalized procedure. It is therefore not intended that this invention be limited except as indicated by the appended claims.

We claim:

1. A method for manipulating an arbitrary relational database in a relational database management system on a computer system having a database query interface, said relational database including relations of tuples with attributes, in order to retrieve information for use in an application knowledge base on said computer system of a knowledge-based system, said method comprising the steps of:
   (1) querying said relational database management system by means of a mapping system on said computer system on behalf of an application program associated with said application knowledge base as specified by a slot list and a class map of said mapping system for said arbitrary database, said class map having a slot whose values are slot maps, to return selected tuples;
   (2) transforming by means of said mapping system said selected tuples into slot values; and
   (3) supplying by means of said mapping system said slot values to slots of units of said application knowledge base.

2. The method according to claim 1 further including the step of creating units by means of said mapping system in said application knowledge base if units addressed by said slot values are nonexistent.

3. The method according to claims 1 or 2 including the steps of:
   (a) providing to said knowledge-based system by means of said mapping system a system mapping knowledge base of general applicability;
   (b) providing a transformation procedure of general applicability by means of said mapping system for transforming tuples into slot values and for creating new units; and
   (c) providing a user mapping knowledge base of specific applicability to said application knowledge base by means of said mapping system, said user mapping knowledge base being distinct from said system mapping knowledge base, said user mapping knowledge base supplying descriptions of said application knowledge base to said transformation procedure.

4. The method according to claim 3 wherein said querying step (1) comprises:
   (i) providing a query translation procedure of substantially general applicability by means of said mapping system for translating a knowledge base query into a structured query language query; and
   (ii) translating a specific knowledge base query into a specific structured query language query by means of said mapping system in response to descriptions supplied to said query translation procedure by said user mapping knowledge base.

5. The method according to claim 4 further including the steps of:
   (iii) providing a functions knowledge base by means of said mapping system;
   (iv) providing a translation knowledge base by means of said mapping system;
   (v) providing a translators knowledge base by means of said mapping system;
   (vi) providing function descriptions to said query translation procedure from said functions knowledge base by means of said mapping system;
   (vii) providing translation descriptions to said query translation procedure from said translation knowledge base by means of said mapping system; and
   (viii) providing translator descriptions to said query translation procedure from said translators knowledge base by means of said mapping system.

6. The method according to claim 1 wherein said relational database has base relations which form a source of view relations, wherein one of said base relations forming said view relation source is restricted to contain at least one tuple for every class member unit in said application knowledge base in order to promote efficient conversion of information between said relational database and said application knowledge base.

7. The method according to claim 1 wherein said slot maps comprise database type, knowledge base type, and computable type.

8. The method according to claim 7 wherein said units contain at least four related slot map partitions slots, including
   a first partitions slot,
   a rest partitions slot,
   a first local partitions slot, and
   a rest local partitions slot,
   said related slot map partitions slots being derived from a slot maps slot, said first partitions slot and said rest partitions slot having as values a mathematically complete and disjoint partition of first slot maps in said slot maps slot, said first local partitions slot, and said rest local partitions slot having as values a mathematically complete and disjoint partition of second slot maps in said slot maps slot, said second slot maps representing local slots of a class whose name is the value in a class name slot, the method further including the steps for computing partitions of said related slot map partitions slots of:
   (1) creating a partition for each slot map in said slot maps slot by means of said mapping system, said partition containing the slot name and the relations needed by each said slot map; thereafter
   (2) merging by means of said mapping system all partitions created by Step (1) which depend only on the value of a covering relation slot and/or the value in a member conditions relations slot and placing the merged result in said first partitions slot; thereafter
   (3) merging by means of said mapping system all partitions remaining from said Step (1) and said Step (2) which depend on exactly the same relations and placing the merged result in said rest partitions slot; and thereafter
   (4) repeating said Steps (1) through (3) by means of said mapping system for the values of the slot maps which represent the slots which are local to the class whose name is in the class name slot and storing the resulting partitions in said first local partitions slot, and said rest local partitions slot, so that only one query is needed to retrieve all of the slots in one partition for use in efficient generation of queries in a structured query language.

9. The method according to claim 1 further including the step of:
   updating by means of said mapping system data in a tuple in said application relational database in response to a command of said knowledge-based system.

10. The method according to claim 9 wherein said updating step includes converting a knowledge-based system update command into a structured query update command in response to mapping instructions of a user mapping knowledge base.

11. A computer-based information mapping system for an arbitrary relational database of a relational database management system having a database query interface, said relational database including relations of tuples with attributes, said information mapping system for use in connection with an application knowledge base of a knowledge-based system, said information mapping system comprising:
 (1) means for accessing said relational database management system as specified by a slot list and a class map of said mapping system, said class map having a slot whose values are slot maps, in order to return selected tuples;
 (2) means for transforming said selected tuples into slot values; and
 (3) means for supplying said slot values to slots of units of said application knowledge base.

12. The system according to claim 11 further including means for creating units in said application knowledge base.

13. The system according to claim 12 further including:
 (a) means providing a system mapping knowledge base of general applicability; and
 (b) means providing a user mapping knowledge base of specific applicability to said application knowledge base, said user mapping knowledge base being distinct from said system mapping knowledge base, said user mapping knowledge base for supplying descriptions of said application knowledge base to said transformation procedure.

14. The system according to claim 13 wherein said accessing means comprises:
 (i) means providing a query translation procedure of substantially general applicability for translating a knowledge base query into a structured query language query; and
 (ii) means for translating a specific knowledge base query into a specific structured query language query in response to descriptions supplied to said query translation procedure by said user mapping knowledge base.

15. The system according to claim 14 further comprising:
 (iii) means providing a functions knowledge base;
 (iv) means providing a translation knowledge base;
 (v) means providing a translators knowledge base;
 (vi) means providing function descriptions to said query translation procedure from said functions knowledge base;
 (vii) means providing translation descriptions to said query translation procedure from said translation knowledge base; and
 (viii) means providing translator descriptions to said query translation procedure from said translators knowledge base.

16. The system according to claim 13 wherein said relational database has base relations which form a source of view relations, and wherein one of said base relations forming said view relation source is restricted to contain at least one tuple for every class member unit in said user mapping knowledge base in order to promote efficient conversion of information between said relational database and said application knowledge base.

17. The system according to claim 13 wherein said system mapping knowledge has a structure representing at least the mapping from one relation to one class and the mapping of one attribute to a single slot.

18. The system according to claim 13 wherein said system mapping knowledge base has a structure representing at least the mapping from one relation to multiple classes.

19. The system according to claim 13 wherein said system mapping knowledge base has a structure representing at least the mapping from multiple relations to a single class.

20. The system according to claim 13 wherein said system mapping knowledge has a structure representing at least the mapping from multiple attributes of a relation to the value or values of a single slot.

21. The system according to claim 13 wherein said system mapping knowledge has a structure representing at least the mapping from one attribute of a relation to the values of multiple slots.

22. The system according to claim 13 wherein said system mapping knowledge has a structure representing at least the mapping of tuples of relations into member units organized into a multiple inheritance taxonomy.

23. The system according to claim 13 wherein said system mapping knowledge has a structure representing at least the transforming of attribute values into knowledge base units, numbers or strings, and any type of data structure supported by the LISP programming language.

24. The system according to claim 13 wherein said system mapping knowledge has a structure representing the mapping from multiple relations to a single class, the mapping from one relation to multiple classes, the mapping from multiple attributes of a relation to the value or values of a single slot, the mapping from one attribute of a relation to the values of multiple slots, the mapping of tuples of relations into member units organized into a multiple inheritance taxonomy, and the transforming of attribute values into knowledge base units, numbers or strings, and any type of data structure supported by the LISP programming language.

25. The system according to claim 23 wherein the mapping between the identification value of a unit (UID value) and a member unit is represented in a member unit name, wherein each said UID is unique across all view relations, and the value of a UID name slot is a LISP function which is used to compute the member name for each member unit.

26. The system according to claim 24 wherein a UID name inversion slot is provided whose value is a LISP function which computes said UID given a member name for querying and updating said application relational database.

27. The system according to claim 11, wherein at least one class map is a subclass of a parent class map such that member conditions of said at least one class map comprise the member conditions inherited from parents plus local member conditions which distinguish said at least one class map from sibling class maps.

28. The system according to claim 26, wherein said member conditions are expressed as predicate (Boolean functions) on attributes in a view relation.

29. The system according to claim 11 wherein said slot maps comprise database type, knowledge base type, and computable type.

30. The system according to claim 28 wherein said units contain at least four related slot map partition slots, including
- a first partitions slot,
- a rest partitions slot,
- a first local partitions slot, and a rest local partitions slot,
- said related partition slots being derived from a slot maps slot, said first partitions slot and said rest partitions slot having as values a mathematically complete and disjoint partition of first slot maps in said slot maps slot, said first local partitions slot, and said rest local partitions slot having as values a mathematically complete and disjoint partition of second slot maps in said slot maps slot, said second slot maps representing local slots of a class whose name is the value in a class name slot for use in efficient generation of queries in a structured query language.

31. The system according to claim 29 wherein each said partition has the following format:
([list of the relation aliases] . [list of slot names]).

32. The system according to claim 11 wherein said slot maps are of at least a first type and a second type, said first type wherein slot values are computed by said relational database and said second type wherein slot values are computed by a knowledge base associated with said application knowledge base.

* * * * *